(12) United States Patent
D'Alusio et al.

(10) Patent No.: US 6,497,427 B1
(45) Date of Patent: Dec. 24, 2002

(54) BICYCLE FRAME

(75) Inventors: Christopher P. D'Alusio, Bethel, CT (US); Christopher A. Peck, Southbury, CT (US)

(73) Assignee: Cannondale Corporation, Bethel, CT (US)

( * ) Notice: Subject to any disclaimer, the term of this patent is extended or adjusted under 35 U.S.C. 154(b) by 31 days.

(21) Appl. No.: 09/831,822

(22) PCT Filed: Jun. 9, 2000

(86) PCT No.: PCT/US00/15915

§ 371 (c)(1), (2), (4) Date: May 15, 2001

(87) PCT Pub. No.: WO00/76836

PCT Pub. Date: Dec. 21, 2000

(51) Int. Cl.$^7$ ................................................. B62K 11/00
(52) U.S. Cl. ....................................................... 280/288
(58) Field of Search ............................. 280/281.1, 283, 280/284, 285, 286, 288

(56) References Cited

U.S. PATENT DOCUMENTS

| 600,329 | A | | 3/1898 | Burnham | |
|---|---|---|---|---|---|
| 4,500,103 | A | * | 2/1985 | Klein | 280/281.1 |
| 4,621,827 | A | * | 11/1986 | Klein | 280/274 |
| 5,018,758 | A | * | 5/1991 | Klein | 280/281.1 |
| 5,129,665 | A | | 7/1992 | Sutter et al. | 280/274 |
| 5,452,911 | A | | 9/1995 | Klein et al. | 280/288 |
| 5,476,278 | A | | 12/1995 | Levin et al. | 280/288 |
| 5,803,477 | A | | 9/1998 | Reisinger | 280/284 |
| 2002/0030345 | A1 | * | 3/2002 | Colnago | 280/288 |

* cited by examiner

Primary Examiner—Kevin Hurley

(57) ABSTRACT

The present invention is directed to a mountain bike frame (10) for use with a rear wheel (118). The frame is a "diamond-type" frame that includes seat stay tubes (32, 34). The seat stay tubes (32, 34) are spaced apart to define a gap distance (C) between the inner surface of the seat stay tubes (32, 34) at a tire intersection point that at a minimum is greater than about 2 inches. In addition, the seat stay tubes (32, 34) have a modulus of elasticity value multiplied times the moment of inertia value is between about 1.0 lb×inches$^2$ and about 10 lb×inches$^2$. The frame is for use with only a rear disc brake mounted to one of the seat stay tubes (32,34).

27 Claims, 7 Drawing Sheets

BICYCLE FRAME

TECHNICAL FIELD OF THE INVENTION

This invention relates generally to frames for bicycles. More particularly, the invention is directed to a mountain bicycle frame.

BACKGROUND OF THE INVENTION

Conventional bicycle frames use tubes joined into closed frameworks to interconnect the components (front fork/handlebar assembly, seat, crankset, rear wheel) and transmit the loads there between. The tubes also keep the components in spacial relation, i.e., they maintain the components relative proximity.

The traditional bicycle frame includes a top tube, a relatively short head tube, a seat tube, a down tube, a bottom bracket, a pair of chain stays, a pair of dropouts, and a pair of seat stays. The top tube connects at its front end to the top of the head tube, and extends backward to the top of the seat tube. The down tube connects at the front end to the bottom of the head tube and extends downwardly and rearwardly to the bottom bracket where the seat tube and the down tube are connected. The pair of chain stays extend rearwardly from the bottom of the seat tube to the dropouts. The pair of seat stays connect directly or indirectly to the top of the seat tube. The seat stays extend backward from the seat tube to the dropouts. The seat stays generally include two seat stay tubes that converge from the dropouts toward the seat tube. The dropouts support the rear wheel axle. This conventional frame design is called the "diamond" frame, because when viewed from the side, the top tube, down tube, chain stays, and seat stays enclose a diamond-shaped space.

Such frames are used for both road bikes and mountain bikes. The terrain that a bike is used on dictates the load requirements for the bike and the performance characteristics of the components. For example, since mountain bikes are used on rough terrain and often are ridden over roots and jumps they must be more durable than road bikes, which encounter relatively smooth surfaces.

With respect to performance characteristics, due to the riding conditions encountered on mountain bikes, mountain bike brakes must provide more braking force than road bike brakes. To that end, mountain bikes are typically equipped with cantilever brakes. In order to mount cantilever brakes for use on a rear wheel, the seat stay tubes must include brake bosses. The brake bosses extend generally perpendicular to the seat stay tubes. Cantilever brakes include two separate brake arms that are pivotally mounted on the brake bosses. A cable links the arms to a brake lever mounted on the handlebars. The other end of each arm has a pad mounted thereto. When the lever is depressed, the cable causes the upper end of each arm lo move outward Consequently, the lower end of each arm and the pads connected thereto move inward and contact opposite sides of the rim of the rear wheel. Cantilever brakes apply a large braking force to the rim.

More over, cantilever brakes exert large lateral forces on the seat stays, which has a tendency to separate the seat stays from one another. In order for the seat stays to endure these forces and to minimize the tendency for the seat stays to spread, they must meet certain stiffness requirements. The stiffness requirements have been met bending the seat stay tubes into various geometries, providing large diameter seat stay tubes, providing tubes with increased wall thicknesses and/or using materials that exhibit increased stiffness. These techniques can be used separately or in different combinations. However these techniques can add weight to the frame, which is undesirable.

Some mountain bikes today are equipped for use with cantilever brakes or disc brakes. The seat stays for such frames are robust enough to with stand use with cantilever brakes, and the seat stays have bosses for receiving cantilever brakes. Thus, the techniques mentioned above are used to ensure that the seat stays are stiff enough for use with the cantilever brakes.

Road bikes, on the other hand, typically use caliper brakes. In order to mount caliper brakes to a frame, the seat stays generally include a seat stay bridge that extends between each of the seat stay tubes. The bridge has a bore defined therein for pivotally mounting the caliper brakes. The caliper brakes apply less braking force than cantilever or disc brakes and require less robust seat stays. Thus, the seat stays for road bikes are usually less stiff and lighter than mountain bikes.

The need exists for a lighter weight mountain bike frame that meets the performance characteristics for mountain bikes.

SUMMARY OF THE INVENTION

According to the present invention a mountain bike frame for use with a rear wheel is disclosed. The frame includes a head tube, a top tube, a down tube, a bottom bracket, a seat tube, a pair of dropouts, a pair of chain stay tubes, and a pair of seat stay tubes.

The top tube extends rearwardly from the head tube. The down tube extends substantially rearwardly and downwardly from the head tube. The seat tube has a first portion connected to the top tube and a second portion coupled to the down tube, such that the head tube, top tube, down tube and seat tube form a first substantially triangular first region. The bottom bracket is connected to the down tube and seat tube. Each chain stay tube in the pair is spaced from the other and extends generally rearwardly from the bottom bracket to the associated dropout. Each seat stay tube in the pair is spaced from the other and coupled to the top tube so that the seat stay tubes extend generally rearwardly and downwardly from the top tube to the associated dropout. The seat stay tubes define a gap distance between the inner surface of the seat stay tubes at a tire intersection point that at a minimum is greater than about 2 inches. The seat stay tubes also have a modulus of elasticity value and a moment of inertia value such that the modulus of elasticity value multiplied times the moment of inertia value is between about 1.0 lb×inches$^2$ and about 10 lb×inches$^2$.

In one embodiment, the frame is for use with a rear disc brake coupled to one of the seat stays.

In yet another embodiment, the present invention is directed to a bicycle including the above frame.

DETAILED DESCRIPTION OF THE PREFERRED EMBODIMENTS

Figure 1:
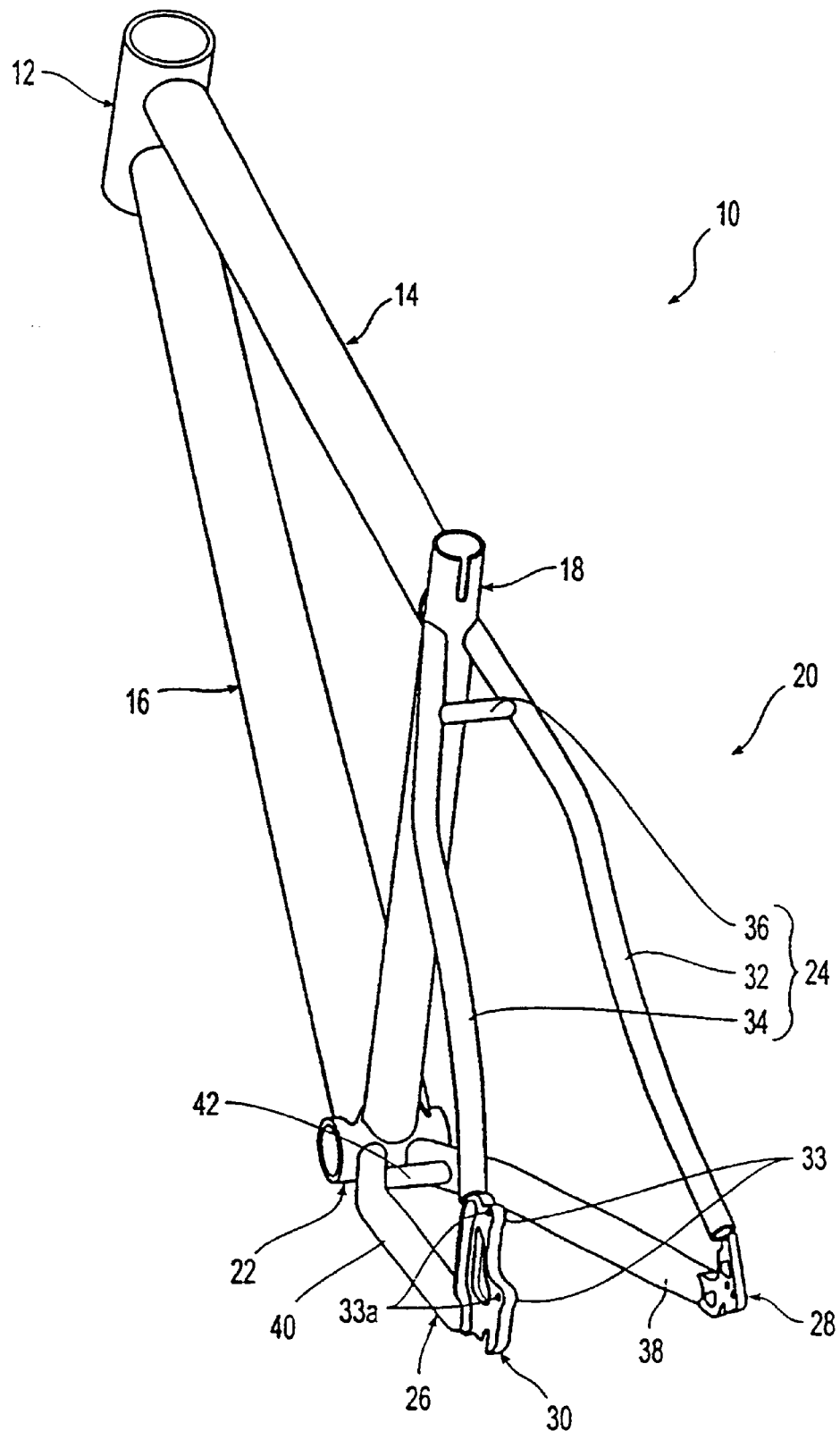
FIG. 1 is a rear, perspective view of a bicycle frame in accordance with this invention.
Figure 2:
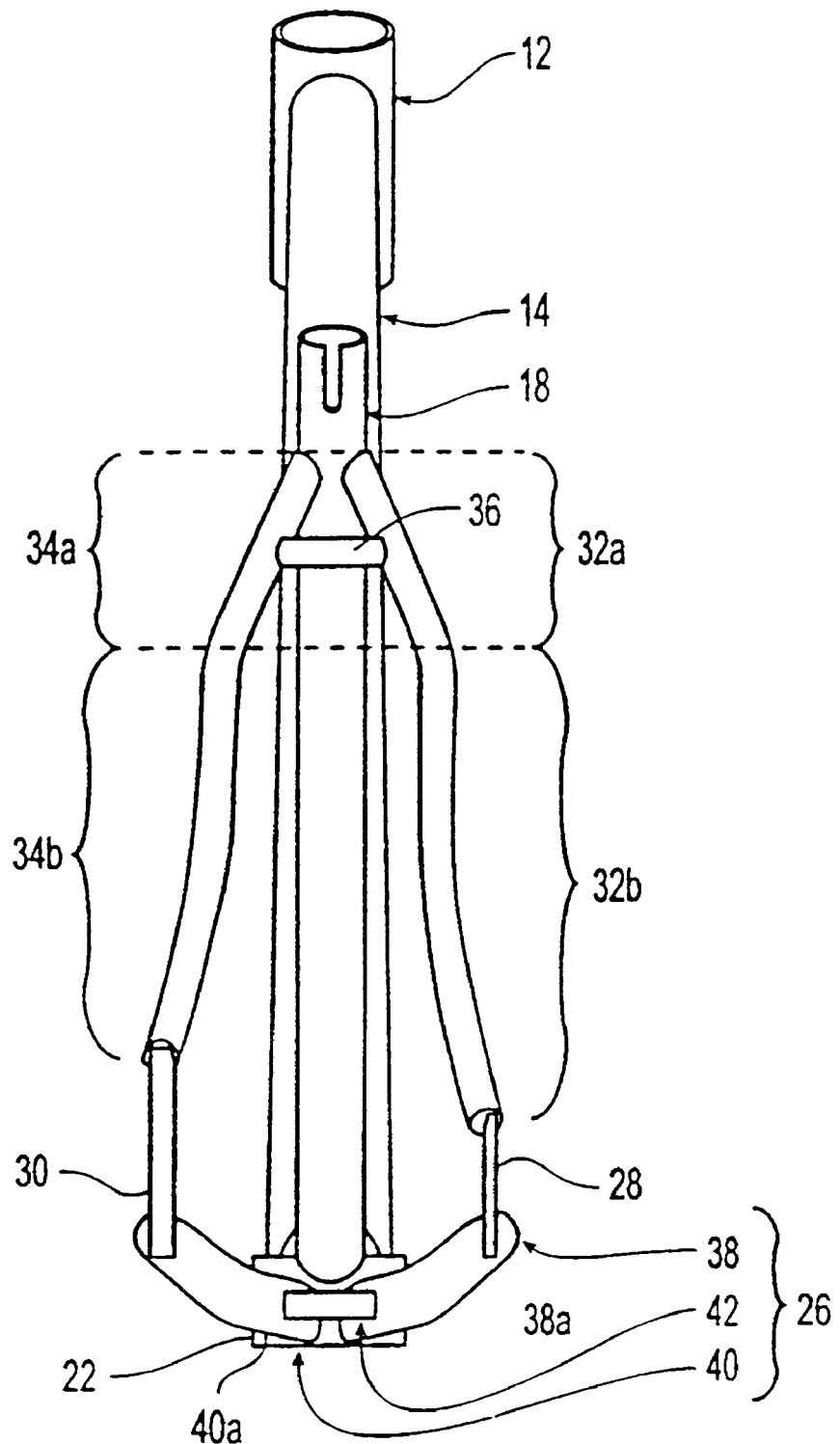
FIG. 2 is a rear view of the frame of FIG. 1.

FIGS. 1 and 2 illustrate bicycle frame 10 in accordance with the present invention. The bicycle frame 10 is a "diamond" type frame and includes a head tube 12, a top tube 14, a down tube 16, a seat tube 18, and a rear triangle assembly 20. The head tube 12 is generally vertical. The top tube 14 extends rearwardly from the top of the head tube 12 and ends at a first portion on the seat tube 18. In this embodiment, the first position is near the upper end of the tube however the first portion can be elsewhere such as centrally disposed on the seat tube.

Figure 3:
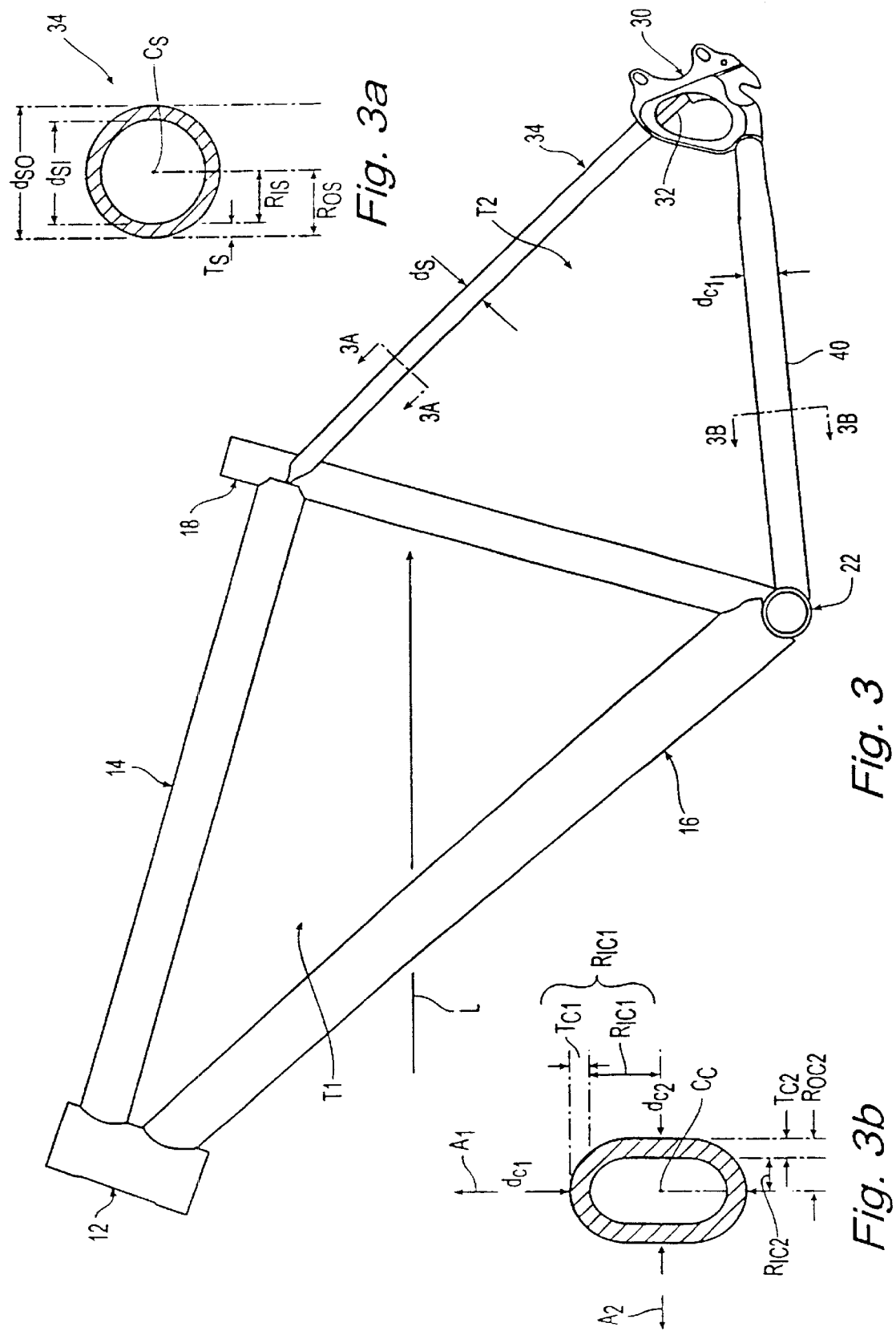
FIG. 3 is a side view of the frame of FIG. 1.

The down tube 16 extends rearwardly from the bottom of the head tube 12. The seat tube 18 is generally vertical and has a bottom bracket 22 connected to the lower end. The down tube 16 is joined to the bottom bracket 22 and the bottom of the head tube 12. As shown in FIG. 3, the head tube 12, top tube 14, down tube 16 and seat tube 18 form a first substantially triangular region T1.

As shown in FIGS. 1 and 2, the rear triangle assembly 20 generally includes a seat stay assembly 24, a chain stay assembly 26, and a pair of rear dropouts or brackets 28 and 30. The seat stay assembly 24 includes a pair of seat stay tubes 32 and 34 that are coupled to the top tube 14 through the seat tube 18. The seat stay tubes 32 and 34 extend from opposite sides of the top of the seat tube 18 and end at the dropouts 28 and 30, respectively. In another embodiment, the seat stay tubes can be connected directly to the top tube, and the top tube connected to the seat tube. Disc brake bosses 33 are coupled tot the seat stay tube 34. In this embodiment, the bosses are formed integrally with the dropout 30. In another embodiment the bosses can be near the dropout. The disc brake bosses 33 define bores 33a in the dropout. In another embodiment, various numbers of bosses, such as one.

As best seen in FIG. 2, the seat stay tubes 32 and 34 converge toward one another from the dropouts 28 and 30 to the seat tube 18. Each seat stay tube 32 or 34 is formed of two sections 32a–b or 34a–b, respectively. The first section 32a or 34a is closest to the seat tube 18 and the second section 32b or 34b is closest to the dropouts 28 and 30. The first and second sections 32a and 32b are disposed at an angle to one another. The first and second sections 34a and 34b are also disposed at an angle to one another. The second sections 32b and 34b are curved.

Referring to FIGS. 1 and 2, the seat stay assembly 24 further includes a seat stay bridge member 36. The seat stay tubes 32 and 34 are joined together by the laterally extending seat stay bridge member 36. The seat stay bridge member 36 extends between the first sections 32a and 34a of the tubes 32 and 34. The bridge member 36 is disposed at a location spaced upwardly from a tire intersect point P.

The chain stay assembly 26 includes a pair of chain stay tubes 38 and 40. and a chain stay bridge member 42. The chain stay tubes 38 and 40 extend from opposite sides of the bottom bracket 22 and end at the dropouts 28 and 30, respectively. Each chain stay tube 38 and 40 has two sections that are at an angle to one another. The chain stay tubes 38 and 40 are joined together by the laterally extending chain stay bridge member 42 that extends between the first section 38a and 40a of the tubes 38 and 40. As shown in FIG. 3, the seat tube 18, seat stay tubes 34, chain stay tubes form a second substantially triangular region T2.

Referring to FIG. 1, the seat stay tube 34 is shorter than the seat stay tube 32 by at least 5% to accommodate the dropout 30 instead of the dropout 28. The chain stay tube 40 is shorter than the chain stay tube 38 by at least 5% to accommodate the dropout 30 instead of the dropout 28.

Referring to FIGS. 2 and 3. each annular seat stay tube 32 and 34 has a diameter represented by the arrows labeled $d_S$. Each oval chain stay tube 38 and 40 has diameters represented by the arrows labeled $d_{C1}$ and $d_{C2}$ (as shown in FIGS. 3 and 3B).

Referring to FIGS. 3 and 3A, each seat stay tube 32 and 34 is a hollow tube having a center $C_S$. An outer radius of each seat stay tube is defined by the arrows $R_{OS}$ An inner radius of each seat stay tube is defined by the arrows $R_{IS}$. A wall thickness is equal to the outer radius $R_{OS}$ minus the inner radius $R_{IS}$ and defined by the arrows $T_S^R$.

Referring to FIGS. 2, 3 and 3B, each chain stay tube 38 and 40 is a hollow tube having a center $C_C$. The chain stay tube is oval and references two axii A1 and A2 that are perpendicular to one another and the longitudinal axis L of the frame. The first axis A1 extends vertically and the second axis A2 extends laterally. The chain stay tube diameter $d_{C1}$ is defined parallel to the axis A1. The chain stay tube diameter $d_{C2}$ is defined parallel to the axis A2.

A first outer radius of each chain stay tube is defined by the arrows $R_{OC1}$ and is parallel to the axis A1. A first inner radius of each chain stay tube is defined by the arrows $R_{IC1}$ and is parallel to the axis A1. A first wall thickness is equal to the first outer radius minus the first inner radius and defined by the arrows $T_{C1}$.

A second outer radius of each chain stay tube is defined by the arrows Rock and is parallel to the axis A2. A second inner radius of each chain stay tube is defined by the arrows $R_{IC2}$ and is parallel to the axis A2. A second wall thickness is equal to the second outer radius minus the second inner radius and defined by the arrows $T_{C2}$. The first wall thickness $T_{C1}$ is equal to the second wall thickness $T_{C2}$.

The components of the frame are formed of aluminum and joined together by conventional techniques such as welding, soldering, brazing fusing, and the like, as known by those of ordinary skill in the art. The recommended material is aluminum 6061-T6, which is commercially available from various manufacturers. However, other aluminum materials can also be used.

Using the recommended aluminum and frame configuration, the diameter of the seat stay tubes ds is less than both of the diameters of the chain stay tubes $d_{C1}$ and $d_{C2}$. Most preferably, the diameter of the seat stay tubes $d_S$ is 0.625 inches. If another material is used, the diameters of the tubes may be modified. For example, titanium, steel, metal alloys, composite materials, such as carbon, or the like can be used.

The bending stiffness or moment of Inertia (1) in inches$_4$ for the seat stay tubes which have an annular cross-section is calculated using the equation:

$$I = \frac{\pi}{4}[d_{SO}^4 - d_{SI}^4]$$

where, $d_{SO}$=outer diameter of seat stay; and $d_{SI}$=inner diameter of seat stay.

The modulus of elasticity value (E) for the recommended aluminum is 10.1 E$^6$ psi that forms the inventive frame. Other materials have different modulii of elasticity values.

Referring to Table 1, the moment of inertia value of the seat stay tubes is compared for various frames. The frame of Example 1 is a conventional mountain bike frame with seat stay tubes having a diameter of 0.875 inches and a wall thickness of 0.049 inches. The frame of Example 2 is the inventive mountain bike frame with seat stay tubes having a diameter of 0.625 inches and a wall thickness of 0.028 inches.

TABLE I

Seat Stay Tube Characteristics For Aluminum Frames

| Measurement | Example 1 | Example 2 |
| --- | --- | --- |
| Seat Stay Tube Diameter (inches) | 0.875 | 0.625 |
| Seat Stay Tube Wall Thickness (inches) | 0.049 | 0.028 |
| Seat Stay Tube Outer Radius (inches) | 0.4375 | 0.3125 |
| Seat Stay Tube Inner Radius (inches) | 0.3885 | 0.2845 |
| Seat Stay Tube Moment of Inertia (inches$^4$) | 0.011 | 0.002 |
| EI (lb × inches$^2$) | 12.18 | 2.22 |

The conventional frame of Example 1 in comparison to the inventive frame of Example 2 having the seat stays as discussed above has an EI value substantially greater than the EI value of the inventive frame. Thus, EI value accounts for the diameter of the seat stay tubes and the material of which it is formed. For the inventive frame, the recommended EI value is between about 1 lb×inches$^2$ and about 10 lb×inches$^2$. More preferably, the EI value is between about 1 lb×inches$_2$ and about 5 lb×inches$_2$. Still more preferably, the EI value is about 2 lb×inches$^2$ and most preferably the EI value is about 2.2 lb×inches$^2$. Other materials and diameters can be combined so that the frame exhibits the EI value that falls within the above range is used in the inventive frame. It is preferred that the inventive frame has a moment of inertia value determined using the diameters in Table I.

The inventive frame weighs substantially less than the conventional frame. A significant weight savings of about 120 grams for a frame weighing about 1600 grams is achieved.

Figure 4:
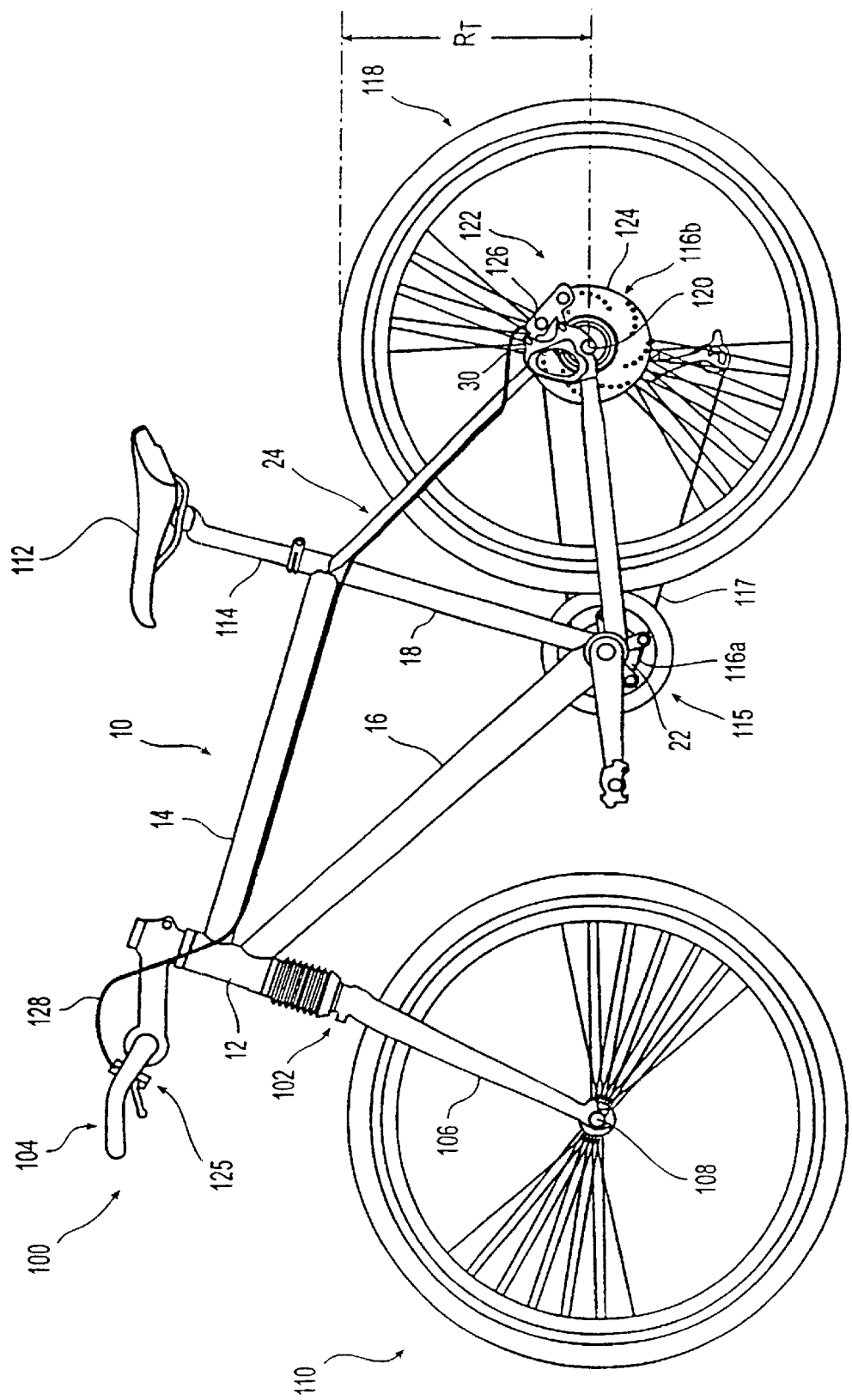
FIG. 4 is a side view of a bicycle incorporating the frame of FIG. 1.

As shown in FIG. 4, a bicycle 100 includes the inventive frame 10. The bicycle includes components that are available in the industry, but the components do not constitute part of the invention. For example, the head tube 12 has a suspension system 102 mounted therein. One end of the suspension system 102 has the handlebars 104 connected thereto, and the other end has front fork 106 extending outwardly and downwardly therefrom. The front fork 106 has the front wheel axle 108 secured thereto for rotatably supporting a front wheel 110. The seat tube 18 accepts seat 112 mounted on a standard seat post 114, and the bottom bracket 22 accepts a pedal assembly 115 that includes a crankset. A front brake assembly (not shown), gears and shifters 116a and b, and chain 117 are also used with the bicycle. These components are known in the art.

The bicycle 100 further includes a rear wheel 118 whose axle 120 is supported by the dropouts 30 and 28 (shown in FIG. 3). The bicycle 100 also includes a disc brake assembly 122. The disc brake assembly 122 includes a disc rotor 124, a brake lever 125, a caliper 126, and a fluid line 128. The disc rotor 124 is fixedly secured to the rear axle 120 so that when the rear wheel 118 and the rotor rotate 124 together. The brake lever 125 is mounted on the handle bars 104. The caliper 126 is mounted on the dropout 30 using the bosses 33 and bores 33a (as shown in FIG. 1).

The caliper 126 further includes two opposing, movable pistons (not shown) that when mounted are on opposite sides of the rotor 124. The fluid line 128 connects the lever 125 to one end of the pistons in the caliper 126. The fluid line contains a flowable hydraulic fluid. The other end of the pistons has pads (not shown) mounted thereon.

When the lever 125 is actuated, the fluid within the line 128 moves and causes the caliper 126 pistons to move the pads against the rotor 124 in pincer-like fashion to apply a braking force to the rotor 124. When the lever 125 is released, the fluid within the line 128 moves and causes the piston to fully retract the pads to end the braking force on the rotor.

One recommended disc brake assembly that is commercially available is manufactured by CODA under the name Compact Disc Brake. However, other bicycle disc brakes can be used with the frame of the present invention, such as those with cables.

Figure 5:
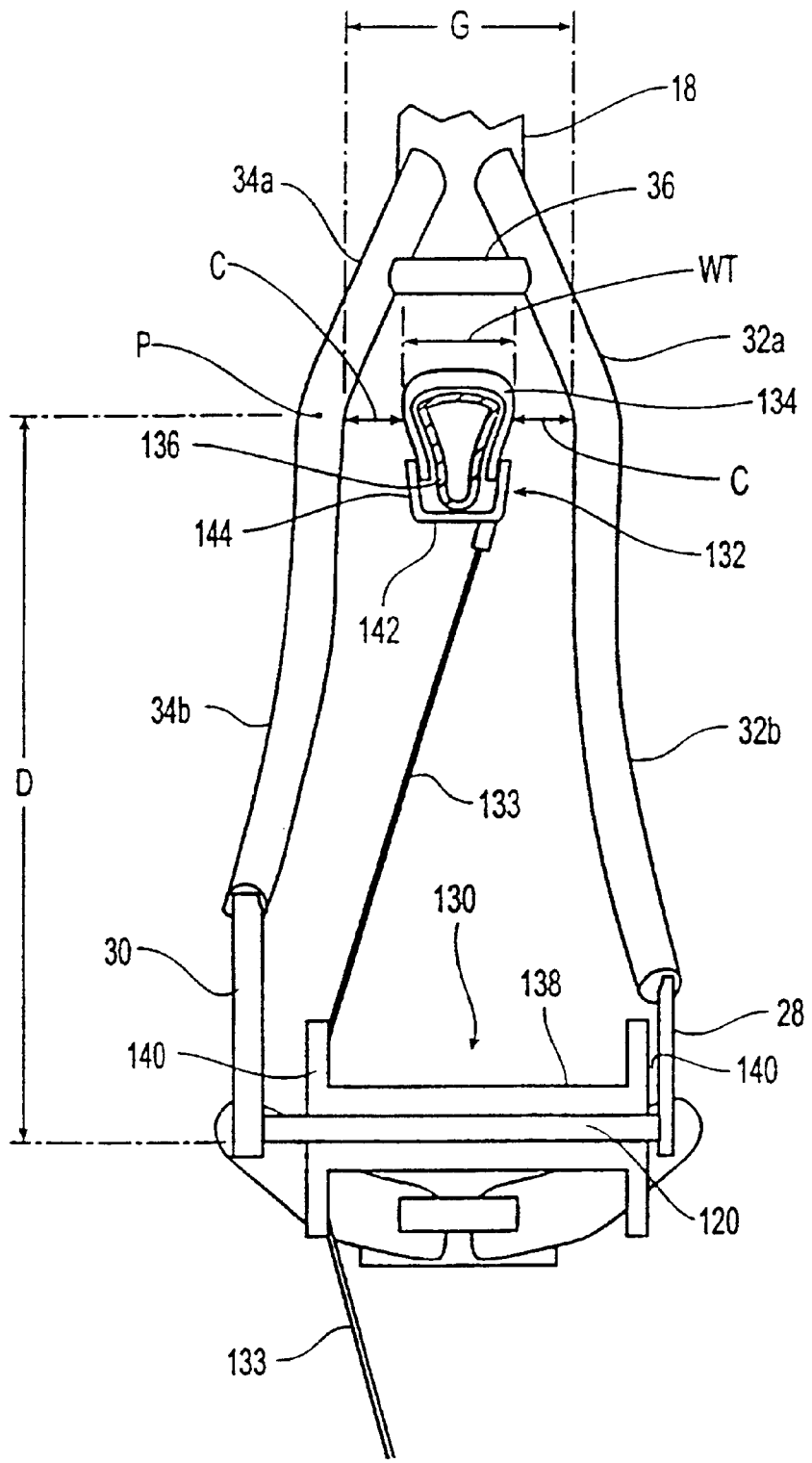
FIG. 5 is a partial, rear view of the bicycle of FIG. 4.

Referring to FIG. 5, the rear wheel 118 will be discussed in more detail. However, the disc brake assembly 122 (as shown in FIG. 4) has been removed for clarity. The rear wheel 118 includes a hub 130, a rim 132, a plurality of spokes 133. a tire 134 and an inner tube 136.

The hub 130 includes a tubular axle portion 138 and axle ends 140 extending perpendicular to the axle portion 138 at both ends thereof. The hub 130 also includes bearings (not shown) and the rear axle 120 extends through the axle portion 138 of the hub.

The rim 132 is an annular structure having a bottom wall 142 and sidewalls 144 extending from both sides perpendicular to the bottom wall 142. The spokes 133 are connected at one end to the inner surface of the rim 132 and at the other end to the axle ends 140 at spaced circumferential locations.

The tire 134 is also annular and has free ends which are located adjacent the sidewalls 144 of the rim 132 so that a chamber is defined therein for receiving the inner tube 136. When the inner tube 136 is inflated the tire 134 also inflates and is forced against the rim sidewalls 144.

The width of the tire, once inflated, is designated by the arrows $W_T$. The narrowest distance between the seat stay tubes 32a–b and 34a–b is located at a point P. Each space between the inflated tire and the seat stay tubes at the tire intersect point P has a distance C, referred to as the tire clearance. The total tire clearance is the sum of the two tire clearance measurements.

For mountain bike tires, the tire width $W_T$ is between about 1.8 inches and about 2.3 inches. The clearance C is typically about 0.25 inches. Referring to FIG. 4, the radius of the wheel 118 is designated by the arrow $R_T$. The radius $R_T$ is typically between about 12.9 inches and about 13.1 inches. Referring to FIG. 5, a distance D between the dropout 30 and the tire intersect point is less than about 13.2 inches and more preferably between about 12.9 inches and about 13.1 inches.

For comparison, road bike tires typically have a tire width less than that of mountain bikes and a radius greater than that of mountain bike tires. For example, the tire width for a road bike tire is between about 0.75 inches and about 1.1 inches. The clearance C is typically about 0.25 inches. The radius of a road bike tire is typically between about 13.25 inches and about 13.5 inches.

The seat stays 32a–b and 34a–b have a gap distance G between the seat stays, which is the sum of the tire width and total clearance. The gap distance is also the width between the inner surfaces of the seat stays at the point P. For mountain bikes, the gap distance is greater than about 2.0 inches, more preferably the gap distance is between about 2 inches and about 3.5 inches, and most preferably the gap distance is between about 2.3 inches and about 2.8 inches. The gap distance for road bikes is between about 0.8 inches and 1.6 inches.

Figure 6:
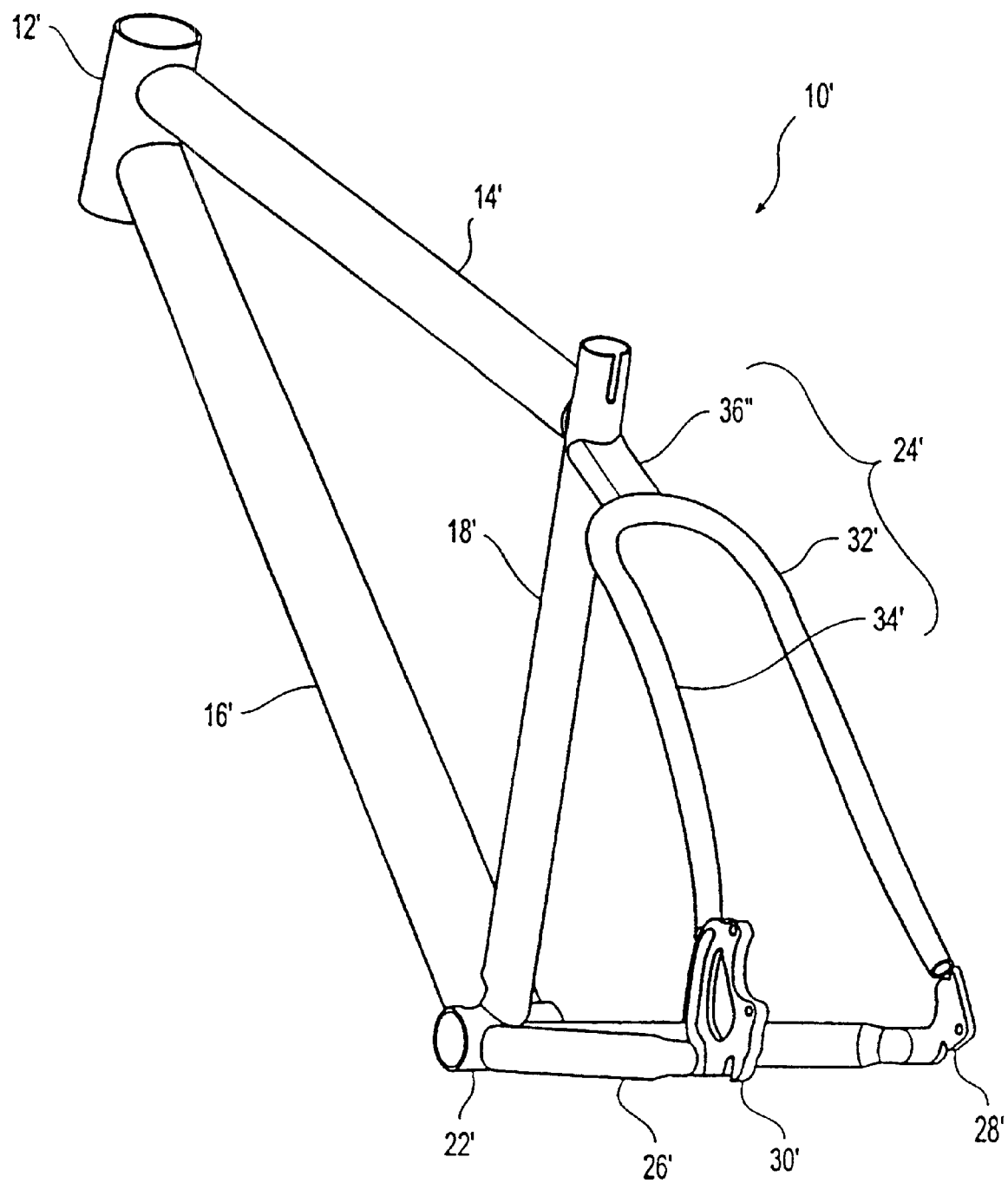
FIG. 6 is a rear, perspective view of another embodiment a bicycle frame in accordance with this invention.
Figure 7:
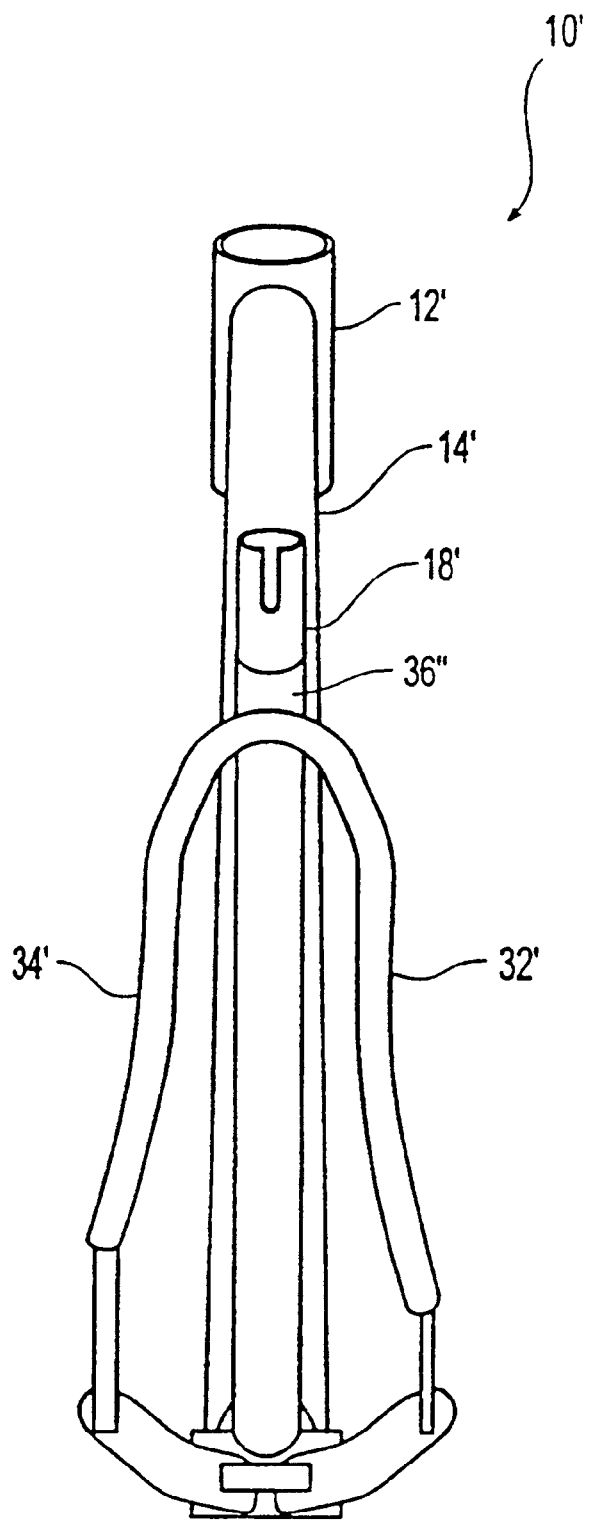
FIG. 7 is a rear view of the frame of FIG. 6.

Referring to FIGS. 6 and 7, another embodiment of a bike frame 10' is shown. The bike frame 10' has elements similar to the frame 10 (as shown in FIG. 1). Similar elements have the same reference number followed by a prime symbol. The seat stay assembly 24' has been modified so that the seat stay tubes 32' and 34' are joined by a curved section. At the curved section the seat stay assembly has a strut tube 36" that connects the seat tubes 32' and 34' to the seat post 18'. The seat tubes otherwise have the same configuration as that discussed above. This configuration allows stiffness to be achieved in a different way than in the first embodiment.

While it is apparent that the illustrative embodiments of the invention herein disclosed fulfill the objectives stated above, it will be appreciated that numerous modifications and other embodiments may be devised by those skilled in the art. For example, although the first embodiment is shown with a constant diameter and wall thickness, in another embodiment the diameter and wall thickness can be varied along the length of the seat stay tubes so long as the average of the modulus of elasticity and moment of inertia along the length is within the above-identified range. Another modification includes using the frame and seat stay configuration of the first embodiment without the seat stay bridge member. Various other features of the embodiments can be combined. Furthermore, the frame can be modified so that the tubes are coupled in different ways than shown while providing the first and second triangular regions. Therefore, it will be understood that the appended claims are intended to cover all such modifications and embodiments which come within the spirit and scope of the present invention.

What is claimed:

1. A bicycle frame for use with a rear wheel comprising:
   a head tube;
   a top tube extending rearwardly from the head tube;
   a down tube extending substantially rearwardly and downwardly from the head tube;
   a seat tube having a first portion connected to the top tube and a second portion coupled to the down tube, such that the head tube, top tube, down tube and seat tube form a first substantially triangular region;
   a bottom bracket connected to the down tube and seat tube;
   a pair of dropouts;
   a pair of chain stay tubes spaced from one another and extending generally rearwardly from the bottom bracket to the associated dropout; and
   a pair of seat stay tubes coupled to the top tube and extending generally rearwardly and downwardly from the top tube to the associated dropout, such that the seat tube, pair of chain stay tubes, and pair of seat stay tubes form a second substantially triangular region, and the pair of seat stay tubes further being spaced from one another and defining a gap distance between the inner surface of the seat stay tubes at a tire intersect point that is greater than about 2 inches, and the seat stay tubes having a modulus of elasticity value multiplied by a moment of inertia value being between about 1.0 lb×inches$^2$ and about 10 lb×inches$^2$.

2. The frame of claim 1, further including a seat stay bridge member extending between the seat stay tubes at a location spaced upwardly from the tire intersect point.

3. The frame of claim 1, wherein the seat stay tubes are connected to the seat tube.

4. The frame of claim 1, wherein the first portion of the seat tube is adjacent the upper end of the seat tube.

5. The frame of claim 1, wherein the first portion of the seat tube is centrally disposed on the seat tube.

6. The frame of claim 1, further including a seat stay strut, the seat stay tubes being joined by a curved section, and the seat stay strut extending between the seat tube and the curved section.

7. The frame of claim 1, wherein the frame includes a disc brake boss coupled to one of the seat stay tubes near the associated dropout.

8. The frame of claim 1, wherein the seat stay tubes having an annular cross-section with a wall thickness being less than about 0.03 inches and an outer diameter being less than about 0.800 inches.

9. The frame of claim 1, wherein a distance between the dropout and the tire intersect point is less than about 13.2 inches.

10. The frame of claim 1, a distance between the dropout and the tire intersect point is between about 12.9 inches and about 13.1 inches.

11. The frame of claim 1, further including the moment of inertia value being less than 0.05 inches$^4$.

12. The frame of claim 8, wherein the frame is formed of aluminum.

13. The frame of claim 1, further including the moment of inertia being about 0.002 inches$^4$.

14. The frame of claim 10, further including the modulus of elasticity value being about 10.1E$^6$.

15. The frame of claim 1, further including the modulus of elasticity value multiplied times the moment of inertia value being between about 1 lb×inches$^2$ to about 5 lb×inches$^2$.

16. The frame of claim 1, further including the modulus of elasticity value multiplied times the moment of inertia value being about 2.2 lb×inches$^2$.

17. The frame of claim 1, wherein the frame is formed of titanium.

18. The frame of claim 1, wherein the frame is formed of steel.

19. The frame of claim 1, wherein the frame is formed of a composite material.

20. The frame of claim 1, wherein the gap distance is between about 2 inches and about 3.5 inches.

21. The frame of claim 1, wherein the gap distance is between about 2.3 inches and about 2.8 inches.

22. A bicycle comprising:
   a frame including
      a head tube,
      a top tube extending rearwardly from the head tube,
      a down tube extending substantially rearwardly and downwardly from the head tube,
      a seat tube having a first portion connected to the top tube and a second portion coupled to the down tube, such that the head tube, top tube, down tube and seat tube form a first substantially triangular region,
      a bottom bracket connected to the down tube and seat tube,
      a pair of dropouts,
      a pair of chain stay tubes spaced from one another and extending generally rearwardly from the bottom bracket to the associated dropout, and
      a pair of seat stay tubes coupled to the top tube and extending generally rearwardly and downwardly from the upper end of the seat tube to the associated dropout, such that the seat tube, pair of chain stay tubes, and pair of seat stay tubes form a second substantially triangular region, and the pair of seat stay tubes further being spaced from one another and defining a gap distance between the inner surface of the seat stay tubes at a tire intersect point that is greater than about 2 inches, and the seat stay tubes having a modulus of elasticity value multiplied by a moment of inertia value being between about 1.0 lb×inches² and about 10 lb×inches², a front wheel assembly including a front wheel rotatably connected to one end and handlebars connected to the other end, and the front wheel assembly being connected to the head tube of the frame;

a rear wheel rotatably connected to the dropouts of the frame;

a seat is mounted on a seat post, and the seat post is disposed within the seat tube;

a pedal assembly is operatively connected to the bottom bracket and the rear wheel; and a disc brake assembly is mounted on the frame.

23. The bicycle of claim 22 wherein the frame includes a disc brake boss coupled to one of the seat stay tubes near the associated dropout for mounting the disc brake assembly one of the seat stay tubes.

24. The bicycle of claim 23, further including a rear axle for supporting the rear wheel, and wherein the disc brake assembly further including a disc rotor fixedly secured to the rear axle;

a brake lever mounted on the handlebars;

a caliper mounted on the disc brake boss, the caliper having an engaged and a disengaged position, such that in the engaged position the caliper clamps the rotor and in the disengaged position the caliper is spaced from the rotor; and a fluid line containing a fluid operatively connecting the lever to the caliper.

25. The bicycle of claim 23, further including a seat stay bridge member extending between the seat stay tubes at a location spaced upwardly from the tire intersect point.

26. The bicycle of claim 23, wherein a distance between the dropout and the tire intersect point is less than about 13.2 inches.

27. The bicycle of claim 23, wherein the modulus of elasticity value multiplied times the moment of inertia value is about 2 lb×inches².

* * * * *